(12) United States Patent
Fukasawa

(10) Patent No.: US 7,061,646 B2
(45) Date of Patent: Jun. 13, 2006

(54) COLOR CORRECTION TABLE GENERATING METHOD, IMAGE PROCESSING DEVICE, IMAGE PROCESSING METHOD AND RECORDING MEDIA

(75) Inventor: Kenji Fukasawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 816 days.

(21) Appl. No.: 09/982,997

(22) Filed: Oct. 22, 2001

(65) Prior Publication Data
US 2002/0097907 A1    Jul. 25, 2002

(30) Foreign Application Priority Data
Oct. 23, 2000  (JP)  .............................. 2000-322077
Sep. 12, 2001  (JP)  .............................. 2001-277240

(51) Int. Cl.
G06F 15/00    (2006.01)
G03F 3/08     (2006.01)
G06K 9/00     (2006.01)

(52) U.S. Cl. ........................ 358/1.9; 358/520; 358/518; 382/167

(58) Field of Classification Search ................. 358/1.9, 358/520, 523, 518; 382/167
See application file for complete search history.

(56) References Cited

U.S. PATENT DOCUMENTS
6,882,445 B1 *   4/2005   Takahashi et al. ........... 358/1.9

FOREIGN PATENT DOCUMENTS
| EP | 0 321 983 | 6/1989 |
| EP | 0 948 194 | 10/1999 |
| JP | 09-214787 | 8/1997 |
| JP | 10-322561 | 4/1998 |

* cited by examiner

Primary Examiner—Mark Wallerson
Assistant Examiner—Charlotte M. Baker
(74) Attorney, Agent, or Firm—Lowe Hauptman & Berner, LLP

(57) ABSTRACT

In a color correction table generating method, an image processing method, an image processing device and a recording media, which performs a better color reproduction, after a scaling section correlates a white point of a color space of an image input signal to a maximum brightness point having the same chromaticity as the white point and having the maximum brightness in a color space of an output device, a three dimensional color correction table, which correlates a color point of the color space of the image input signal to a color point of the color space of the image output device, is generated in the color space wherein the white point substantially corresponds to the maximum brightness point, When a color of the image input signal is reproduced by the output device, by executing a white point correction and using the three dimensional color correction table, a better color reproduction is obtainable by way of a wider color space.

16 Claims, 11 Drawing Sheets

Example of one dimension LUT

COLOR CORRECTION TABLE GENERATING METHOD, IMAGE PROCESSING DEVICE, IMAGE PROCESSING METHOD AND RECORDING MEDIA

BACKGROUND OF INVENTION

1. Field of Invention

The present invention relates to an image processing for an image input signal in case that a color space of an image input signal is correlated to that of an image output device.

2. Description of the Related Art

When an image input signal is reproduced by using a display device such as a projector or the like, a color space of an input image signal is different from that of a display device, and therefore, it is necessary to make a color transformation.

There is a method of a color transformation of the display device, which uses a color correction of one dimension. FIG. 6 is a drawing showing an example of an explanation for a color transforming method of the display device. In the color transforming method as shown in FIG. 6, a color balance and a brightness property of the display device are corrected by a one dimensional color correction table of RGB. For example, for correcting a chromaticity of white of the display device, color correction curves of r(R), g(G) and b(B) differ respectively as shown in FIG. 7.

SUMMARY OF INVENTION

However, according to the color transforming method, a range of brightness of R, G, B used in the display device is determined by output of the one dimensional color correction table at the time of a maximum input, i.e. that is a balance of a white point. Therefore, an area having a brightness more than the range is not used as the dot area shown in FIG. 8. Thereby, when color of image input signals is reproduced by the display device, there is a case that the color space of the display device cannot be utilized adequately. Furthermore, it is impossible to perform an accurate color transformation by a color correction using the one dimensional color correction table.

In order to solve the above-mentioned problems, the present invention is to provide a color correction table generating method, an image processing method, an image processing device and a recording media, which perform a better color reproduction.

According to an aspect of the present invention, a color correction table generating method includes the steps of: having a white point of a gamut of image input signal substantially corresponded to a maximum brightness point having a same chromaticity as said white point and a maximum brightness in a gamut of an output device; and generating a three dimensional color correction table, which correlates a color point in the gamut of the image input signal to a color point in the gamut of the image output device, in a specified color space wherein the white point of a gamut of the image input signal substantially corresponds to the maximum brightness point.

According to the thus constructed color correction table generating method, after a white point of a gamut of image input signal is corresponded to a maximum brightness point having a same chromaticity as the white point and a maximum brightness in a gamut of an output device, a three dimensional color correction table, which correlates a color point in the gamut of the image input signal to a color point in the gamut of the image output device, is generated in a specified color space wherein the white point of a gamut of the image input signal substantially corresponds to the maximum brightness point.

According to the present invention, an image processing device executes an image processing to image input signal with referring to a three dimensional color correction table, which correlates a color point in the gamut of the image input signal to a color point in the gamut of the image output device, in a specified color space wherein a white point of a gamut of the image input signal substantially corresponds to a maximum brightness point having a same chromaticity as said white point and a maximum brightness in a gamut of an output device.

Preferably, the color space is a CIELAB color space, a CIELUV color space or a Yxy color space.

Preferably, the white point substantially corresponds to the maximum brightness point by scaling the gamut.

Preferably, a color point out of the gamut of the image output device and in the gamut of the image input signal is correlated to a color point in the gamut of the image output device.

According to an another aspect of the present invention, an image processing method executes an image processing to image input signal with referring to a three dimensional color correction table, which correlates a color point in the gamut of the image input signal to a color point in the gamut of the image output device, in a specified color space wherein a white point of a gamut of the image input signal substantially corresponds to a maximum brightness point having a same chromaticity as said white point and a maximum brightness in a gamut of an output device.

According to an another aspect of the present invention, a computer-readable medium stores a program of instructions for execution by the computer to perform an image processing to image input signal with referring to a three dimensional color correction table, which correlates a color point in the gamut of the image input signal to a color point in the gamut of the image output device, in a specified color space wherein a white point of a gamut of the image input signal substantially corresponds to a maximum brightness point having a same chromaticity as said white point and a maximum brightness in a gamut of an output device.

According to an another aspect of the present invention, a computer-readable medium stores a three dimensional color correction table, which correlates a color point in the gamut of the image input signal to a color point in the gamut of the image output device, in a specified color space wherein a white point of a gamut of the image input signal substantially corresponds to a maximum brightness point having a same chromaticity as said white point and a maximum brightness in a gamut of an output device.

According to an another aspect of the present invention, a projector includes the above mentioned image processing device.

DESCRIPTION OF THE PREFERRED EMBODIMENTS

The embodiment of the present invention will be described in detail hereinafter with referring to the attached drawings. The terms "color reproducing area" described in the present embodiment corresponds to the term "gamut" in claims.

Figure 1:
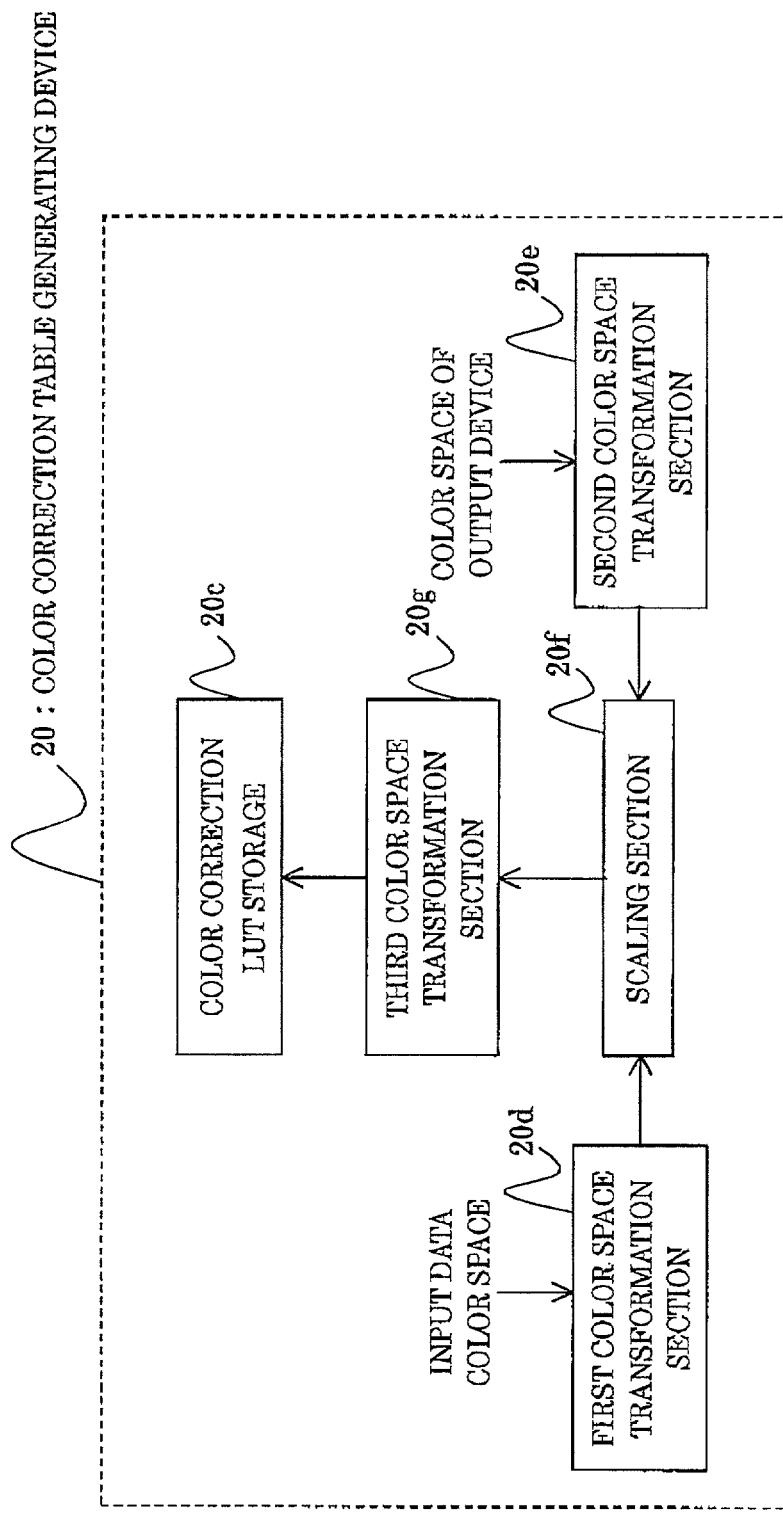
FIG. 1 is a functional block diagram of a color correction table generating device according to an embodiment of the present invention.
Figure 2:
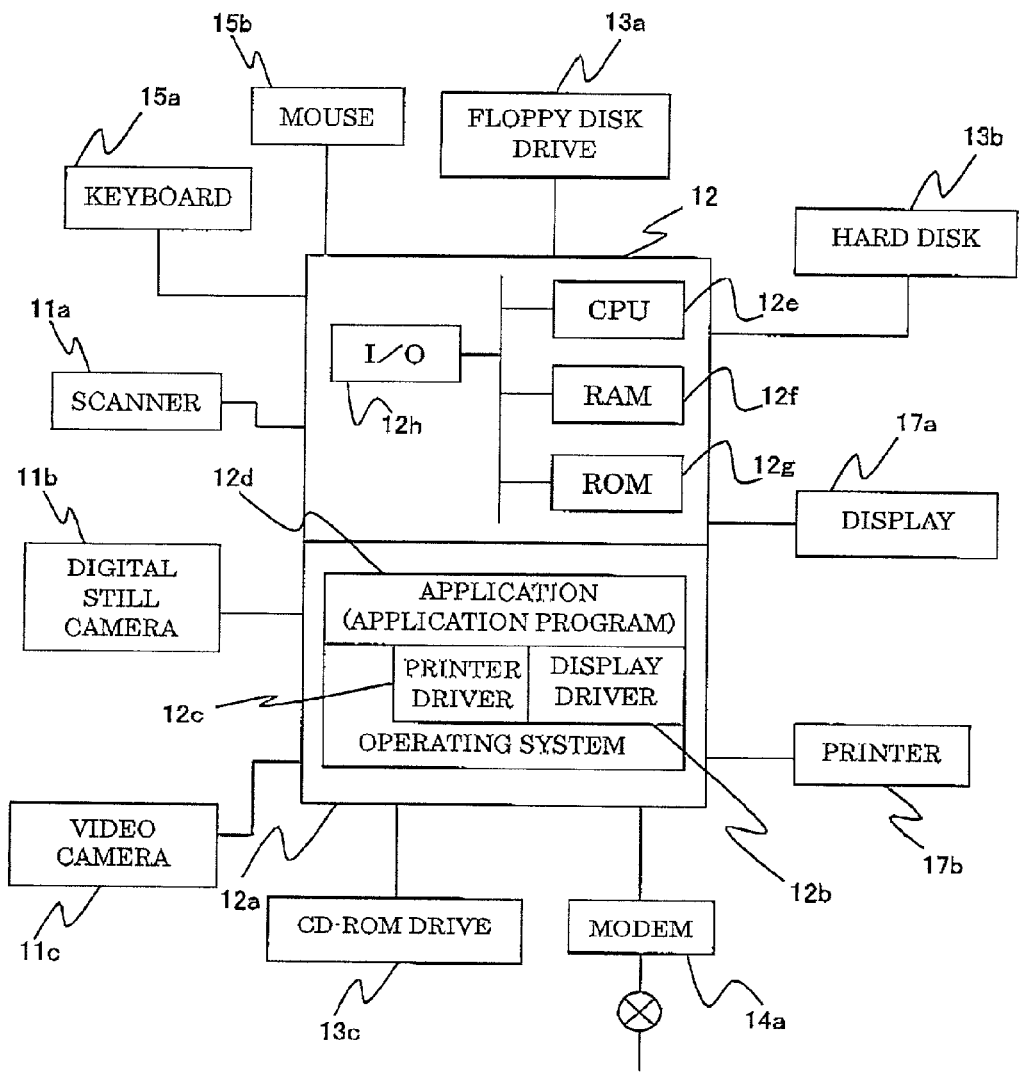
FIG. 2 is an outline block diagram constituting an example of a specific hardware of a color correction table generating device and an image processing device according to an embodiment of the present invention.
Figure 9:
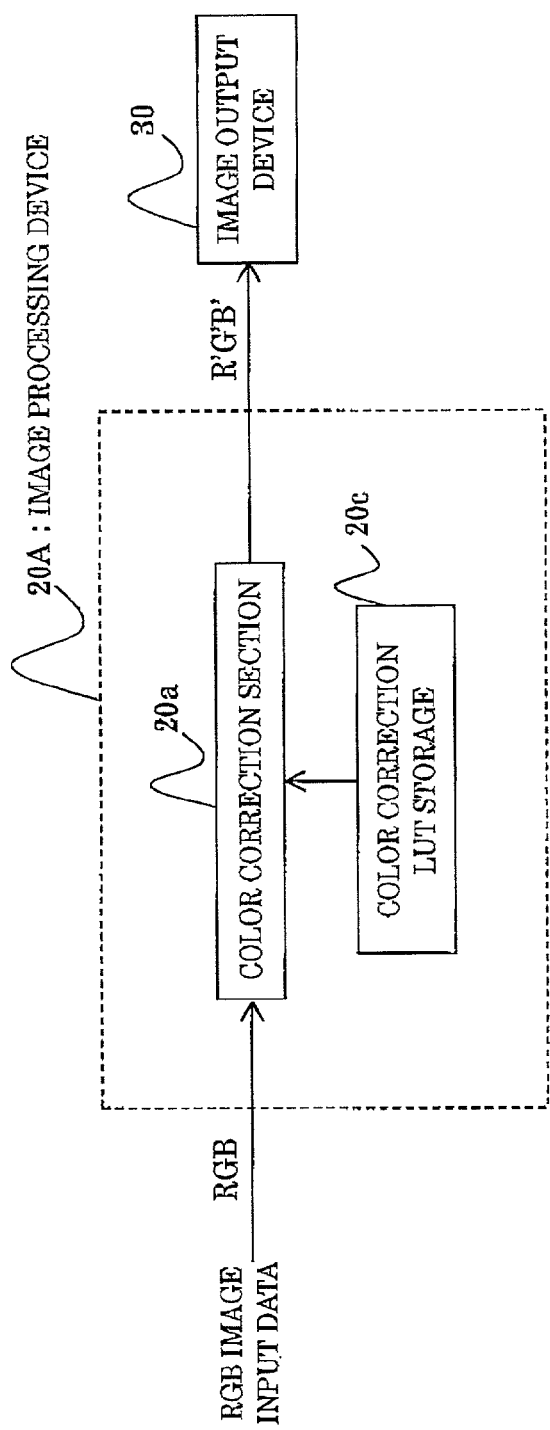
FIG. 9 is a functional block diagram of an image processing device according to an embodiment of the present invention.

FIG. 1 is a functional block diagram showing a color correction table generating device according to an embodiment of the present invention, FIG. 9 is a functional block diagram showing an image processing device according to an embodiment of the present invention, and FIG. 2 shows an example of a concrete hardware construction about the color correction table generating device and the image processing device by an outlined block diagram.

In FIG. 1, a color correction table generating device 20 is provided with: a first color space transformation section 20d, a second color space transformation section 20e, a scaling section 20f, a third color space transformation section 20g and a color correction LUT storage section 20c for storing a generated color correction LUT. The processing of each of these each structures section will be described below in detail.

Furthermore, in FIG. 9, the image processing device 20A executes a desired image processing to RGB image input data and outputs the image-processed image data to the image output device 30. Here, the image data is that a color image is divided into predetermined color components and respective components have some proper strength, and the data has a chromatic color or an achromatic color such as gray and black, if it is mixed in predetermined ratio. The present embodiment will be explain the case where the image output device 30 such as a display or a projector reproduces a color based on RGB data.

The image processing device 20A includes a color correction LUT storage section 20c storing color correction tables; and a color correction section 20a that reads out a selected color correction table (LUT) from the color correction LUT storage section 20c and transforms RGB image input data to R'G'B' image data for the output device with referring to the read out color correction LUT.

The present embodiment employs a computer system as an example of hardware for realizing the color-correction look-up table generator 20 and the image processing apparatus 20A. FIG. 2 shows the computer system as a block diagram. The computer system is provided with a scanner 11a, a digital still camera 11b, and a video camera 11c as image input devices, and they are connected with a computer main unit 12. The individual input devices generate an image data where an image is represented by pixels arranged as dot matrix, and provide the computer main unit 12 with the image data, where the image data represents about 16.7 million colors by 256-gradation display in three primary colors comprising R, G, and B.

A floppy disk drive 13a, a hard disk drive 13b, and a CD-ROM drive 13c are connected with the computer main unit 12 as external auxiliary storage apparatuses, the hard disk 13b stores base programs relating to the system, and necessary programs are read from a floppy disk and a CD-ROM if required. A modem 14a is connected for connecting the computer main unit 12 with an external network or the like as a communication device, and software and data are downloaded for introduction by connecting to the external network through a public communication line. In this example, though the modem 14a is used for the external access through the telephone line, a constitution for access to a network through a LAN adapter is also possible. In addition, a keyboard 15a and a mouse 15b are connected for operating the computer main unit 12.

The computer main unit 12 is provided with a display 17a and a color printer 17b as image output devices. The display 17a is provided with a display area comprising 800 pixels in the horizontal direction and 600 pixels in the vertical direction, and 16,7 million colors are displayed on the individual pixels. This resolution is an example, and the resolution may be changed to 640×480 or 1024×768 as needed.

The color printer 17b is an ink jet printer, and prints an image on a print sheet as a medium with color ink of four colors comprising C, M, Y, and K. As its image resolution, high density print such as 360×360 dpi or 720×720 dpi is available, and as its gradation representation, two-gradation representation by selecting whether attaching the color ink or not is available. A predetermined program is running on the computer main unit 12 to obtain an image through the image input devices, and to display or to provide on the image output device. An operating system (OS) 12a operates as a base program, and a display driver (DSP DRV) 12b and a printer driver (PRT DRV) 12c are integrated into the operating system 12a. The drivers 12b and 12c depend on the models of display 17a and the color printer 17b, and are added to or changed in the operating system 12a according to the models. It is also possible to realize a feature in addition to a standard processing depending on the models. In other words, different additional processes are realized in a permissible range while a common processing system is maintained on a standard system as the operating system 12a.

As a prerequisite for running the program, the computer main unit 12 is provided with a CPU 12e, a RAM 12f, a ROM 12g, an I/O 12h and the like, and the CPU 12e executes the base program written in the ROM 12g as needed while using the RAM 12f as a temporary work area or specified memory area, or a program area, and controls the external apparatuses connected through the I/O 12h and internal apparatuses.

The application 12d is executed on the operating system 12a, which serves as the base program. Contents of the processing in application 12d vary, and include monitoring the operation of keyboard 15a and the mouse 15b as operating devices, properly controlling the different external apparatuses, executing corresponding calculation and the like when they are operated, and displaying or providing a processed result on the display 17a or the color printer 17b.

The computer system obtains image data through the scanner 11a as an image input device, performs a predetermined image processing with the application 12d, and show the processed result as output on the display 17a or the color printer 17b, which serve as image output devices.

The display driver 12b and the printer driver 12c are stored on the hard disk 13b, are read into the computer main unit 12 on startup, and operate. They are stored on a medium such as a CD-ROM or a floppy disk when they are introduced. Thus, these media constitute media for storing the image processing program. The image processing program itself is included in the scope of present invention. In the present invention, though the image processing apparatus is realized as a computer system, the computer system is not necessarily required, and a system that applies the process required in the present invention to similar image data is possible. A system where an image processing system for performing the image processing of present invention is integrated in a digital still camera, and image data after the image processing are used for printing through a color printer is possible. For a color printer, which obtains image data and prints without a computer system, it is possible to constitute such that the image processing of present invention is automatically applied on image data obtained through a scanner, a digital still camera, modem or the like and printing is processed.

Furthermore, the image processing device 20A may be provided in different apparatuses for handling image data such as a projector, a color facsimile apparatus or a color copying apparatus.

Figure 3:
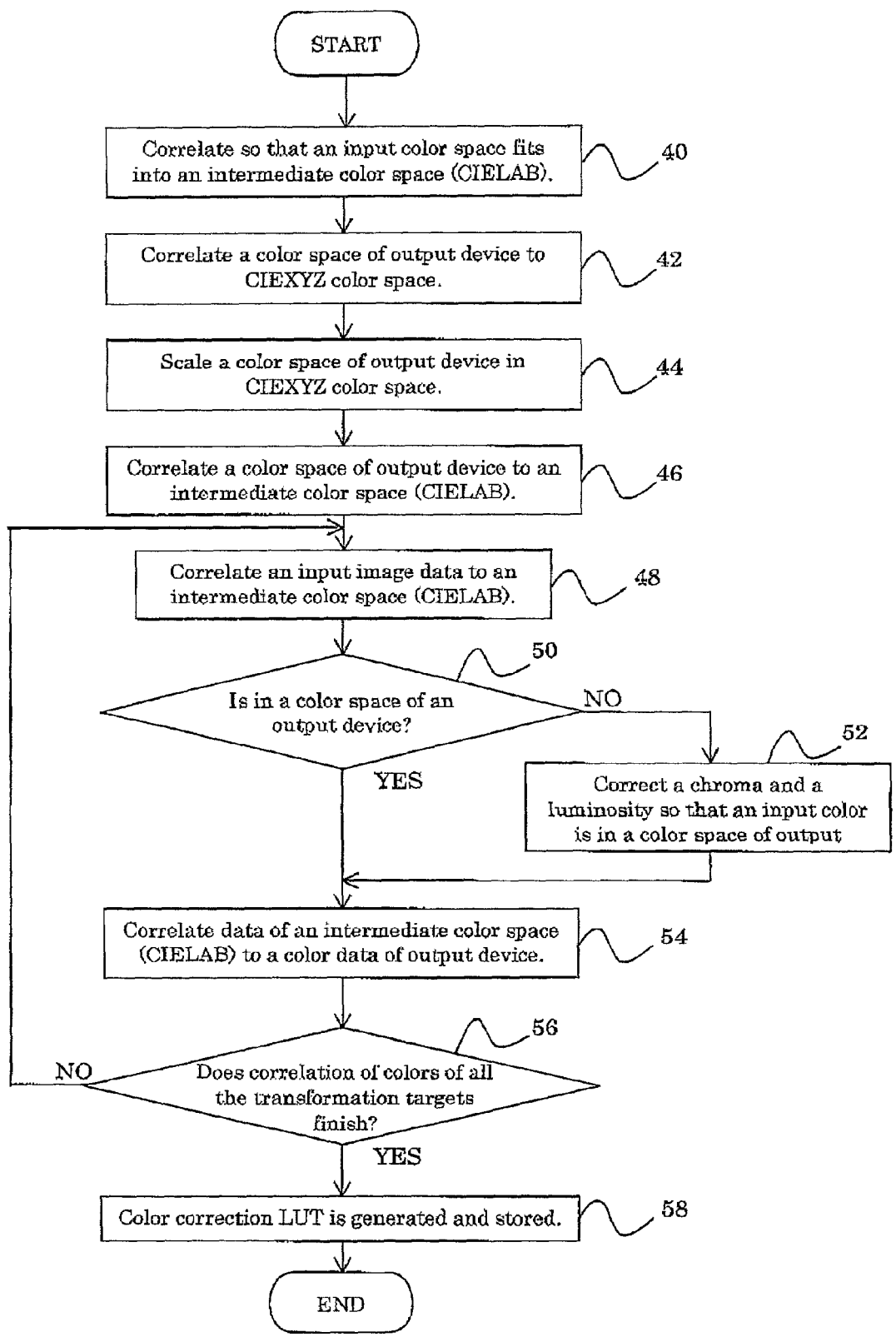
FIG. 3 is a flowchart for explaining a color correction table generating process of an image processing device 20 according to the present invention.
Figure 4:
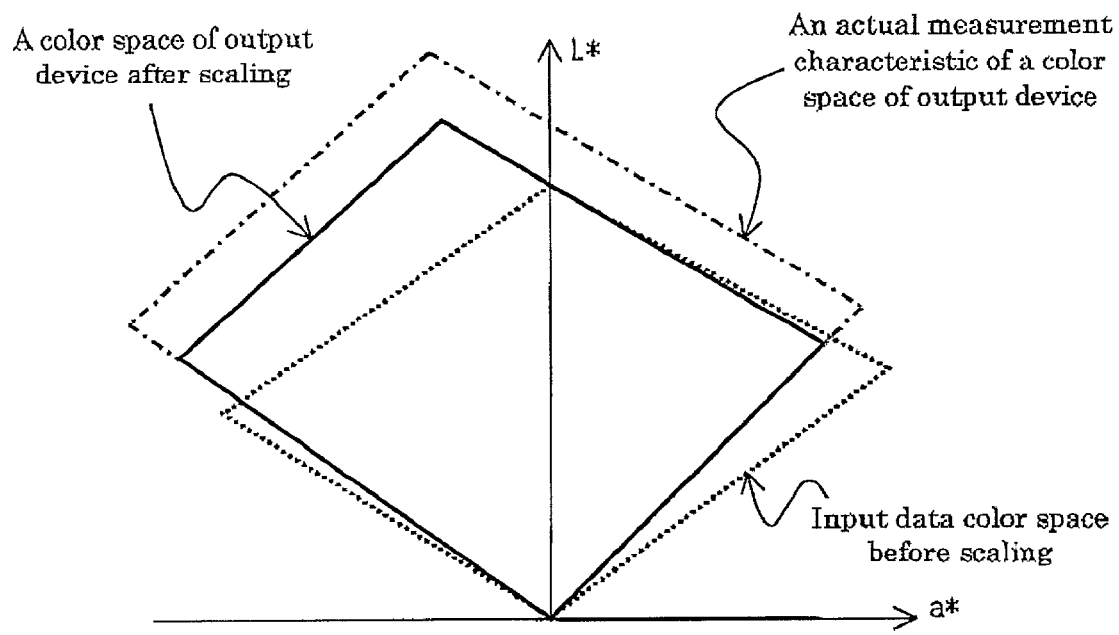
FIG. 4 is a drawing for explaining a relationship between an input data color space and an output device color space.

Referring to FIGS. 3 and 4, a color correction table generating process program which is executed by the color correction table generating device 20 shown in FIG. 1 is explained hereinafter.

FIG. 3 is a flowchart explaining the color correction table generating process program executed by the color correction LUT generating device 20 of the present embodiment. As shown by FIG. 3, the first color space transformation section 20d of the color correction LUT generating device 20 makes a correlation so that an input data color space matches an intermediate color space (CIELAB) (step 40). As the intermediate color space, a CIELUV color space and a Yxy color space may be used as well as the CIELAB color space.

$$\begin{pmatrix} Xa \\ Ya \\ Za \end{pmatrix} = A \begin{pmatrix} Ra \\ Ga \\ Ba \end{pmatrix} = \begin{pmatrix} a11 & a12 & a13 \\ a21 & a22 & a23 \\ a31 & a32 & a33 \end{pmatrix} \begin{pmatrix} Ra \\ Ga \\ Ba \end{pmatrix} \quad (1)$$

If color images having the color characteristics shown by the above expression (1) is displayed by a display device having the color characteristics shown by the following expression (2), $$\begin{pmatrix} Xb \\ Yb \\ Zb \end{pmatrix} = B \begin{pmatrix} Rb \\ Gb \\ Bb \end{pmatrix} = \begin{pmatrix} b11 & b12 & b13 \\ b21 & b22 & b23 \\ b31 & b32 & b33 \end{pmatrix} \begin{pmatrix} Rb \\ Gb \\ Bb \end{pmatrix} \quad (2)$$

the input data color space is correlated to the CIELAB space which is the intermediate color space. At this time, the expression (1) is used to correlate RGB values to tri-stimulus XYZ values. The following equations are used to correlate the tri-stimulus XYZ values to the CIELAB space.

$$L^* = 116(Y/Yn)^{1/3} - 16 \quad \text{if } Y/Yn > 0.008856 \quad (3)$$

$$L^* = 903.29(Y/Yn) \quad \text{if } Y/Yn \leq 0.008856 \quad (4)$$

$$a^* = 500[(X/Xn)^{1/3} - (Y/Yn)^{1/3}] \quad (5)$$

$$b^* = 500[(Y/Yn)^{1/3} - (Z/Zn)^{1/3}] \quad (6)$$

Here, Xn, Yn and Zn are tri-stimulus values with respect to white of input signal.

Next, with respect to the color space of the output device (color reproduce area), the second color space transformation section 20e correlates RGB values to XYZ values by the expression (2) (step 42). The scaling section 20f executes a scaling in a CIEXYZ coordinate in accordance with the following equations so that a white point of the input data color space corresponds to a point having the same chromaticity as the white point of the input data color space and having the maximum brightness in the output device color space in the CIELAB space (step 44).

$$\begin{pmatrix} Xb' \\ Yb' \\ Zb' \end{pmatrix} = c \begin{pmatrix} Xb \\ Yb \\ Zb \end{pmatrix} \quad (7)$$

Here, the scaling changes a scale size of color space. Furthermore, in xy chromaticity coordinate, a chromaticity (x, y) is defined below.

$$x = X/(X+Y+Z)$$

$$y = Y/(X+Y+Z)$$

"c" is a scaling constant, and is calculated by the following equations:

$$\begin{pmatrix} r1 \\ g1 \\ b1 \end{pmatrix} = B^{-1} \begin{pmatrix} Xaw \\ Yaw \\ Zaw \end{pmatrix} \quad (8)$$

and $$c = \frac{1}{\text{Max}(r1, g1, b1)} \quad (9)$$

With respect to the scaled XYZ values, the third color space transformation section 20g applies the above transform equations to the CIELAB space (the expressions (3) to (6) and correlates the color space of the output device to the CIELAB space (step 46). The relationship between the input data color space and the output device color space which are correlated mutually is shown in FIG. 4.

Furthermore, the third color space corresponding section 20g executes a color correlation processing with respect to each pixel of the input images (steps 48 to 56). The RGB value of the input image data is correlated to the CIELAB coordinate by the expressions (1) and (3) to (6).

If a required color exists in a color space of the output device (step 50, Yes), $$\begin{pmatrix} r \\ g \\ b \end{pmatrix} = B^{-1} \frac{1}{C} \begin{pmatrix} X \\ Y \\ Z \end{pmatrix} \quad (10)$$

by using the above expression (10), the data in the CIELAB space is correlated to the color data of the output device, and RGB values of the output device are calculated (step 54).

On the other hand, if a required color does not exist in the color space of the output device (step 50, No), a luminosity and a chroma of the required color are changed and the required color is transferred into the color space of the output device (step 52). Thereafter, (X', Y', Z') is calculated by using an inverse transformation of the expressions (3) to (6) and RGB values of the output device is calculated by the expression (10) (step 54).

After the color correlation processing of the steps 48 to 54 are repeated with respect to RGB values of all the transformation targets (step 56, Yes), a three dimensional color correction LUT is generated, stored in the color correction LUT storage section 20c (step 58) and the processing is finished.

Specifically, the color correction table generating device 20 generates a three dimensional color correction table by correlating RGB value of input data and RGB value calculated by expressions (1), (3) to (6) and (10) on the basis of the RGB value of input data, and therefore, the processing is finished.

Next, with referring to FIG. 5, the operation of the image processing device 20 is explained hereinafter.

Figure 5:
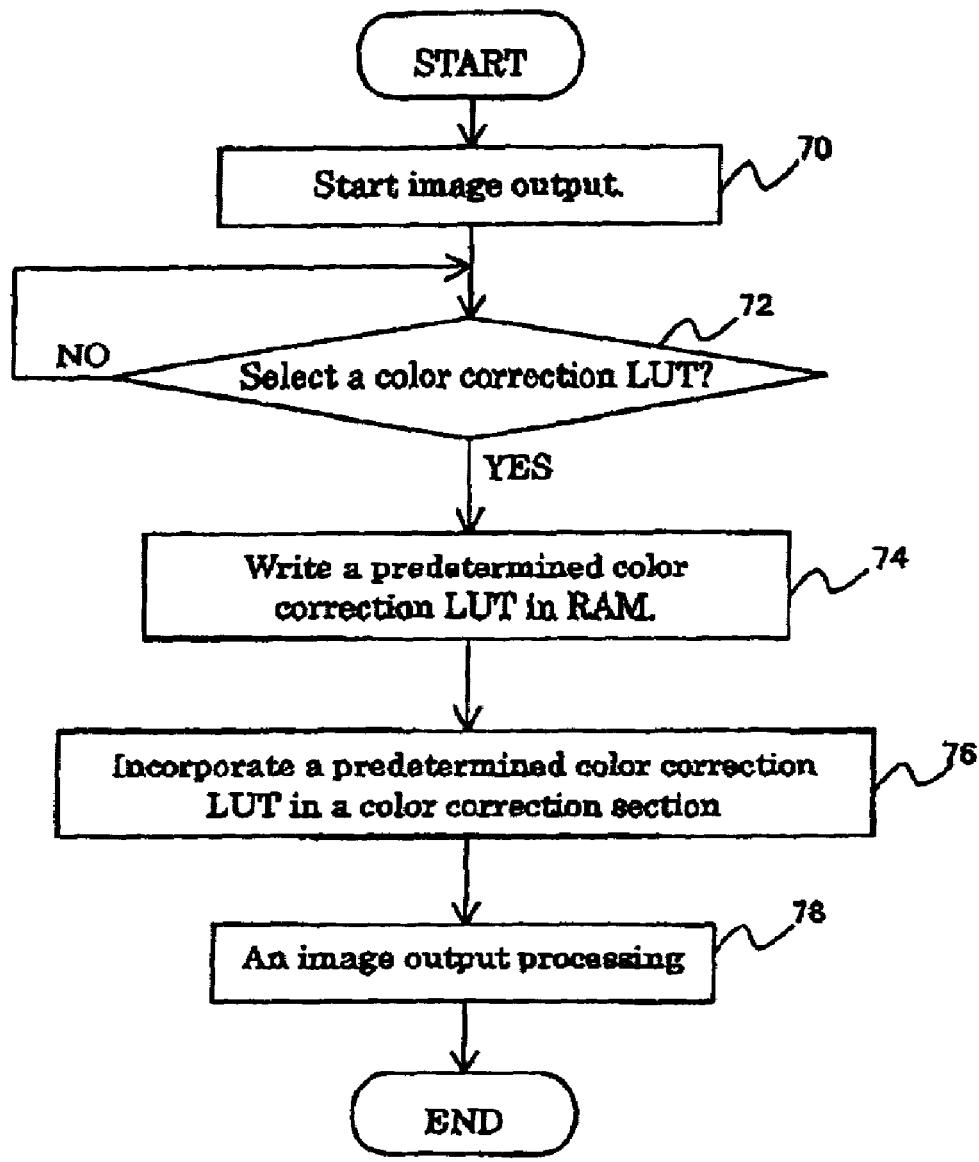
FIG. 5 is a flowchart for explaining an operation of an image processing device 20.
Figure 6:
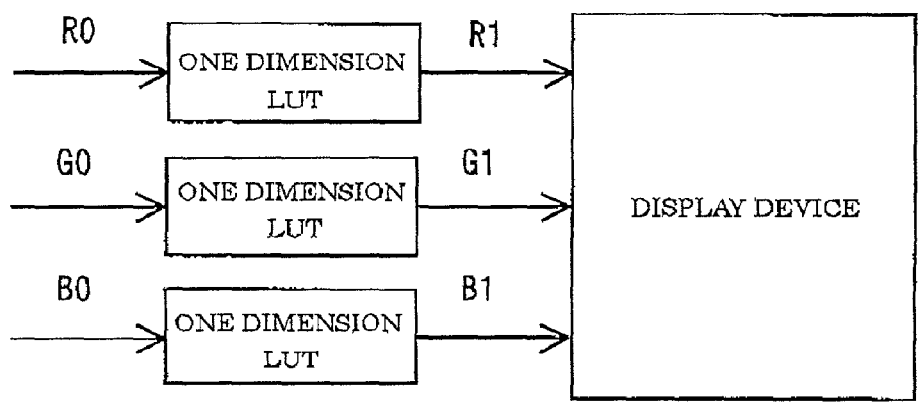
FIG. 6 is a diagram for explaining an example of a color transforming method of a display device.
Figure 7:
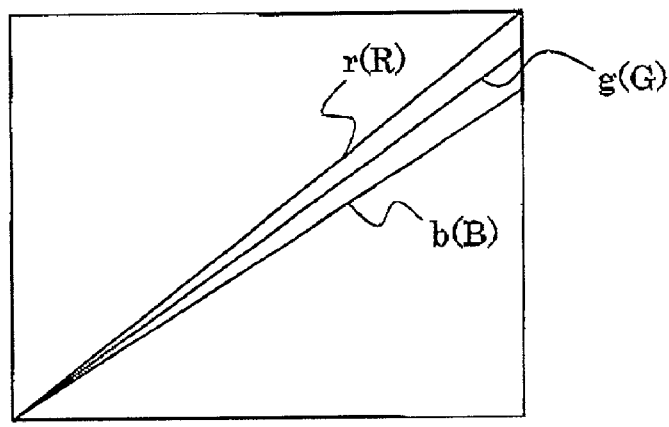
FIG. 7 is a graph for showing color correction curves of r(R), g(G) and b(B) used for a color transforming method.

As shown in FIG. 5, if the start of an image output is instructed by a user (step 70) and if a three dimensional color correction LUT is selected (step 72, Yes), the selected three dimensional color correction LUT is read out from the color correction LUT storage section 20c and it is written into a RAM (step 74). The three dimensional color correction LUT is incorporated in the color correction section 20b (step 76), an image processing is executed by using an interpolation calculation with referring to the three dimensional color correction LUT, and an image output processing is executed (step 78).

Figure 8:
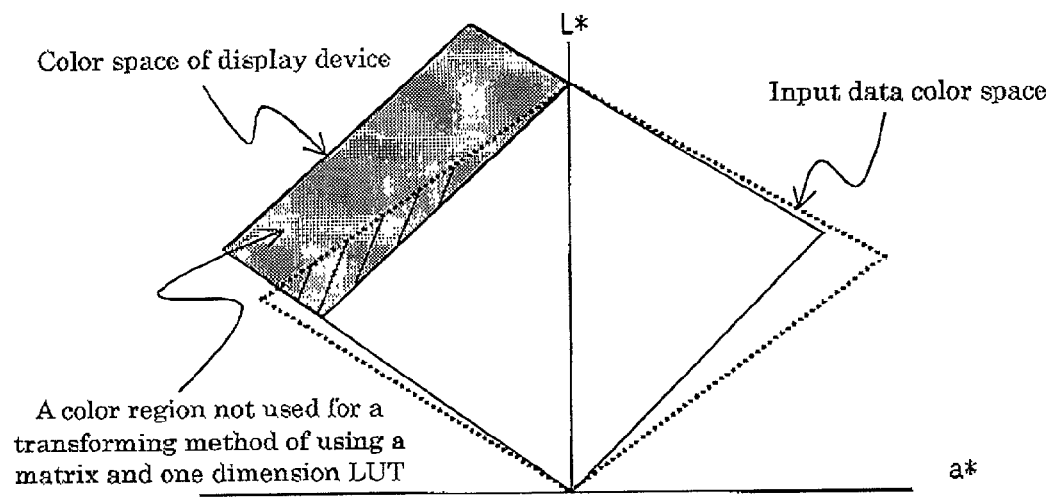
FIG. 8 is a drawing for explaining a problem with respect to a color transforming method.

According to a color transforming method of using a color correction table(s) generated by the present embodiment, when colors of image input signals are reproduced by an output device, a better color reproduction is available by using a wider color space. According to the color transforming method, without using a one dimensional color correction table, by using a three dimensional color correction table and executing a white point correction, it is possible to use as a color space a color region of hatched line of FIG. 8 in dot area shown in FIG. 8.

Modification of the Embodiment

Figure 10:
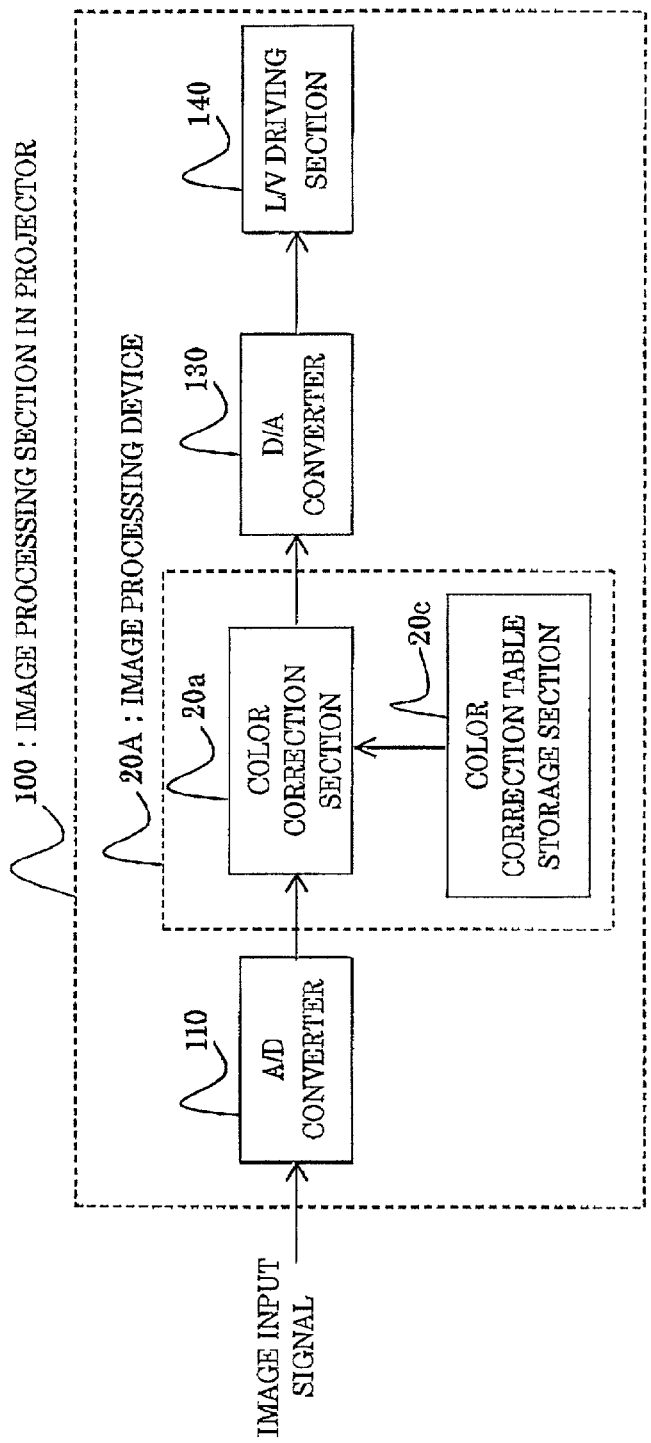
FIGS. 10 and 11 are functional block diagrams wherein an image processing device 20A according to an embodiment of the present invention is provided in an image processing section 100 of projector 30.
Figure 11:
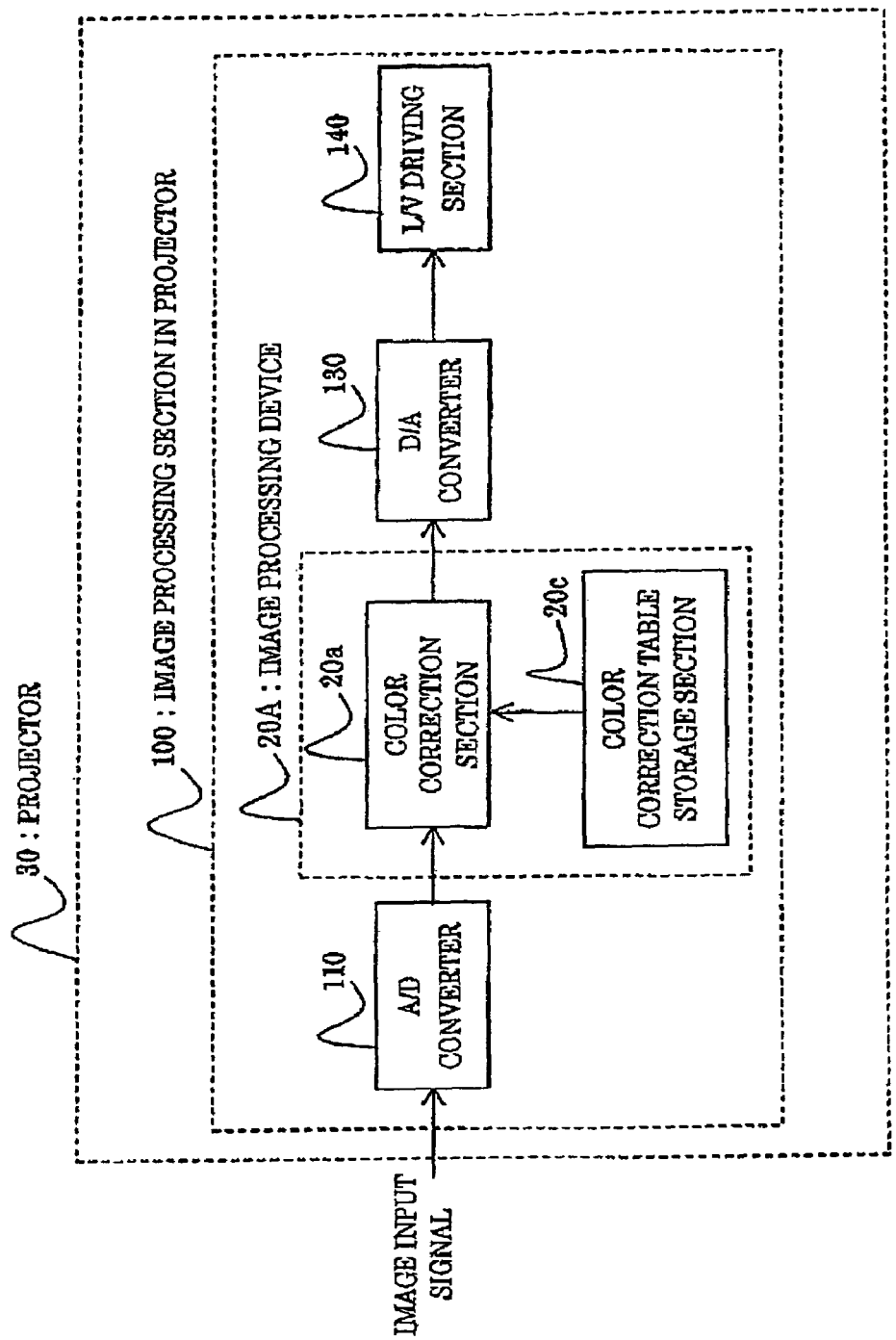

In FIGS. 10 and 11, an example is shown that the above image processing device 20A is set up in the image processing section 100 of a projector 30.

The image processing section 100 of the projector 30 shown in FIGS. 10–11 is provided with: an A/D converter 110 for transforming an analog image input signal to a digital signal; an image processing device 20A including a color correction section 20a for reading out a selected color correction table from a color correction table storage 20c, and executing a required color correction with respect to each RGB image input signal with referring to the read out color correction table; a D/A converter 130 for transforming a digital signal to an analog signal; and an L/V (light valve) driver 140 for driving a liquid crystal light valve to make a projection display of image.

According to the image processing section 100 of the projector 30 which is provided with the image processing device 20A, the color correction section 20a performs a required color correction for the digital image input signal, on the basis of the selected color correction table. The color corrected digital image input signal is transformed to an analog signal by the D/A converter 130 and on the basis of the transformed analog signal, the L/V driver 140 drives the liquid crystal light valve to make a projection display of image.

In this way, according to the image processing section 100 of the projector 30 which is provided with the image processing device 20A, when colors of the image input signal are reproduced by the projector, a better color reproduction is available by using a more wider color space. According to the color transforming method which uses a color correction table generated by the present embodiment, without using a one dimensional color correction table, by using a three dimensional color correction table and executing a white point correction, it is possible to use as a color space a color region of hatched line of FIG. 8 in dot area shown in FIG. 8.

What is claimed is:

1. A color correction table generating method comprising the steps of:

having a white point of a gamut of an image input signal substantially corresponding to a maximum brightness point having a same chromaticity as said white point and a maximum brightness in a gamut of an output device; and generating a three dimensional color correction table, which correlates a color point in the gamut of the image input signal to a color point in the gamut of the image output device, in a specified color space wherein said white point of the gamut of the image input signal substantially corresponds to said maximum brightness point;

wherein a color space in which an image processing is performed using the three dimensional color correction table is wider than a color space in which an image processing is performed using an one-dimensional color correction table.

2. The method of claim 1, wherein the white point of the gamut of the image input signal and said maximum brightness point of the gamut of the image output device initially have different brightness values;

said method further comprising scaling the gamut of the image output device to obtain a scaled gamut which has a scaled maximum brightness point corresponding to said maximum brightness point of the gamut of the image output device and having the same brightness value as the white point of the gamut of the image input signal.

3. The method of claim 2, wherein, in said scaling, color values of a color point in the gamut of the image output device are all multiplied by the same constant to obtain color values of a corresponding color point in the scaled gamut.

4. The method of claim 3, wherein said values are XYZ values in the CIEXYZ color system.

5. The method of claim 1, further comprising scaling the gamut of the image output device to obtain a scaled gamut which has a scaled maximum brightness point corresponding to said maximum brightness point of the gamut of the image output device and having the same brightness value and chromaticity as the white point of the gamut of the image input signal;

wherein, in said scaling, color values of a color point in the gamut of the image output device are all multiplied by the same constant to obtain color values of a corresponding color point in the scaled gamut.

6. The method of claim 5, wherein said values are XYZ values in the CIEXYZ color system.

7. A computer-readable medium storing a program of instructions for execution by the computer to perform an image processing to an image input signal with referring to a three dimensional color correction table, which correlates a color point in a gamut of the image input signal to a color point in a gamut of an image output device, in a specified color space wherein a white point of the gamut of the image input signal substantially corresponds to a maximum brightness point having a same chromaticity as said white point and a maximum brightness in the gamut of the image output device;

wherein a color space in which the image processing is performed using the three dimensional color correction table is wider than a color space in which an image processing is performed using an one-dimensional color correction table.

8. A computer-readable medium storing a three dimensional color correction table, which correlates a color point in a gamut of an image input signal to a color point in a gamut of an image output device, in a specified color space wherein a white point of the gamut of the image input signal substantially corresponds to a maximum brightness point having a same chromaticity as said white point and a maximum brightness in the gamut of the image output device;

wherein a color space in which an image processing is performed using the three dimensional color correction table is wider than a color space in which an image processing is performed using an one-dimensional color correction table.

9. An image processing method executing an image processing to an image input signal with referring to a three dimensional color correction table, which correlates a color point in a gamut of the image input signal to a color point in a gamut of an image output device, in a specified color space wherein a white point of the gamut of the image input signal substantially corresponds to a maximum brightness point having a same chromaticity as said white point and a maximum brightness in the gamut of the image output device;

wherein a color space in which the image processing is performed using the three dimensional color correction table is wider than a color space in which an image processing is performed using an one-dimensional color correction table.

10. An image processing device executing an image processing to an image input signal with referring to a three dimensional color correction table, which correlates a color point in a gamut of the image input signal to a color point in a gamut of an image output device, in a specified color space wherein a white point of the gamut of the image input signal substantially corresponds to a maximum brightness point having a same chromaticity as said white point and a maximum brightness in the gamut of the image output device;

wherein a color space in which the image processing is performed using the three dimensional color correction table is wider than a color space in which an image processing is performed using an one-dimensional color correction table.

11. The image processing device as claimed in claim 10, wherein the color space is a CIELAB color space, a CIELUV color space or a Yxy color space.

12. The image processing device as claimed in claim 10, wherein the white point substantially corresponds to the maximum brightness point by scaling the gamut.

13. The image processing device as claimed in claim 10, wherein a color point out of the gamut of the image output device and in the gamut of the image input signal is correlated to a color point in the gamut of the image output device.

14. A projector comprising the image processing device as claimed in claim 10.

15. The device of claim 10, wherein said three dimensional color correction table correlates each color point of the gamut of the image input signal to one color point of a scaled gamut of the image output device;

said scaled gamut being located within the gamut of the image output device, and obtained by multiplying color values of each color point in the gamut of the image output device by the same constant to obtain color values of a corresponding color point in the scaled gamut.

16. The device of claim 15, wherein said values are XYZ values in the CIEXYZ color system.

* * * * *